(No Model.)

L. C. TIFFANY.

COLORED GLASS WINDOW.

No. 254,409.

3 Sheets—Sheet 1.

Patented Feb. 28, 1882.

Witnesses:
Wm S. Skinner
Henry Beeny

Inventor:
Louis C. Tiffany (No Model.) 3 Sheets—Sheet 2.

L. C. TIFFANY.
COLORED GLASS WINDOW.

No. 254,409. Patented Feb. 28, 1882.

Witnesses:
H. S. Hoyt Jr.
Joseph McLarnin

Inventor:
Louis C. Tiffany
by J. V. Hindonbrides
atty

UNITED STATES PATENT OFFICE.

LOUIS C. TIFFANY, OF MORRISTOWN, NEW JERSEY.

COLORED-GLASS WINDOW.

SPECIFICATION forming part of Letters Patent No. 254,409, dated February 28, 1882.

Application filed July 26, 1881. (No model.)

*To all whom it may concern:*

Be it known that I, LOUIS C. TIFFANY, a citizen of the United States, residing in Morristown, county of Morris and State of New Jersey, have invented a new and useful Improvement in Stained-Glass Windows and Screens, of which the following is a specification.

My invention relates to improvements in colored-glass windows and screens in which the design is produced by the use of small pieces of glass set in metallic frames, forming a mosaic of colored glass.

Figure 1:
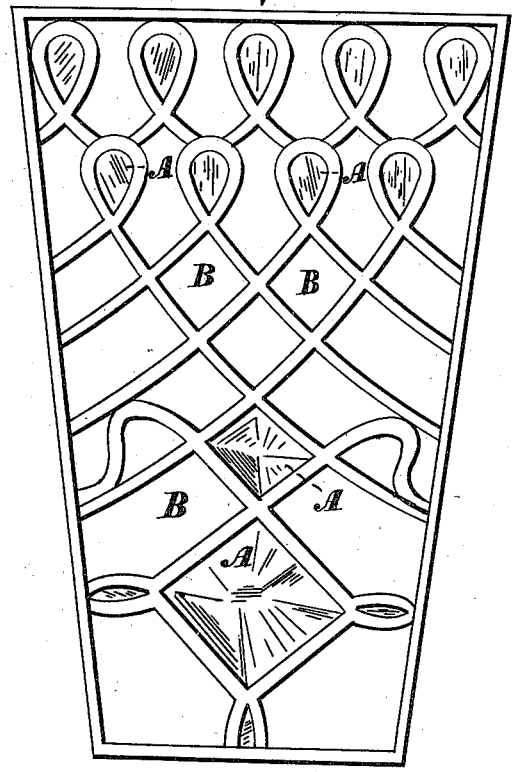
Figure 2:
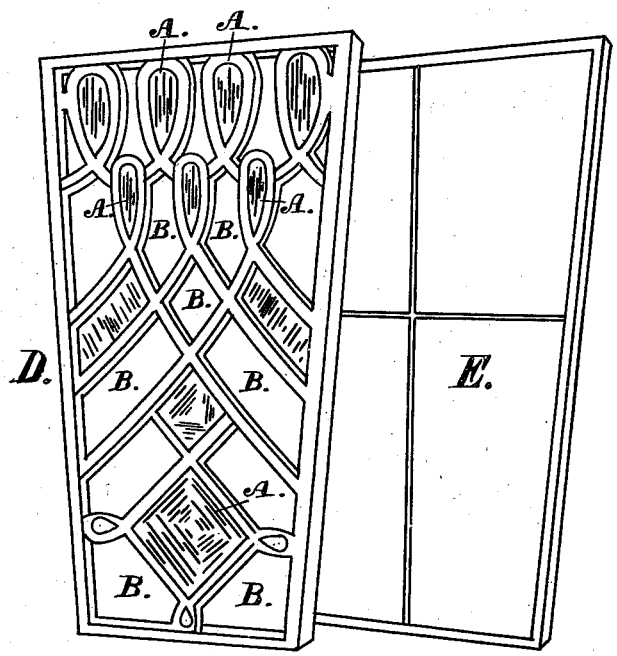
Figure 3:
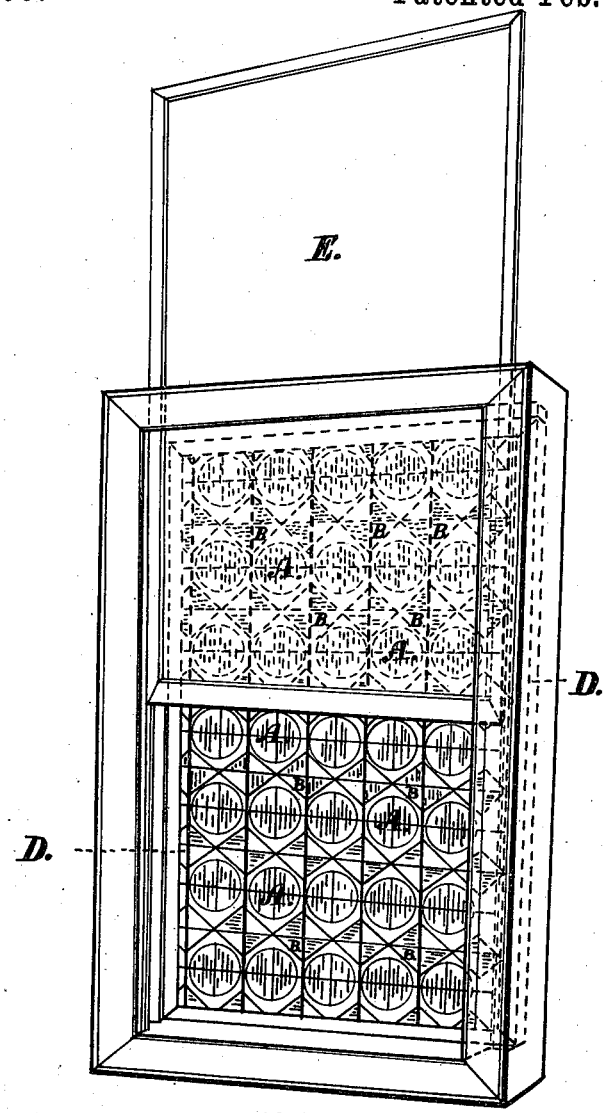

It is well known that direct light is more brilliant than light transmitted through transparent or translucent material; and my invention has for its object the obtaining in stained-glass ornamental work the effect of greater brilliancy gained by a more intense light than is obtainable with glass used in the ordinary manner. I attain this object by the plan or device illustrated in the accompanying drawings, Figure 1 of which represents a window or screen made in conformity with my invention, Fig. 2 representing the detached screen and a window-sash, which forms the second part of my invention; and Fig. 3, the screen and window-sash in a frame.

Similar letters refer to similar parts throughout the several drawings.

A represents pieces of colored glass, which may be iridescent, opalescent, or plain, of any form or shape or tracery desired, and which are set in surrounding and intersecting frames of lead or other material.

B represents empty spaces between the frames through which light has uninterrupted passage, and which thus furnish points or spaces of high light in the design. The proximity of the spaces where direct light is admitted to the points where transmitted light enters through the colored glass produces a peculiarly-brilliant effect.

My invention is also useful in permitting ventilation through the empty spaces without losing the effect of the colored glass, such ventilation being attainable in ordinary windows only by raising them or swinging them back.

My invention also lessens the chance of breaking the window in opening it for the purpose of ventilation, as this is not necessary in my device.

The second part of my invention provides for its application to outside windows, or those which are open to the air. In such cases I place a window of plain glass in the same opening as the one of colored glass, and joined with it by a common frame. The window of plain glass serves to exclude rain, &c., in inclement weather, and is so arranged that it may be raised or lowered at pleasure. This arrangement will not materially interfere with the brilliant effects produced by the mingling of the direct and transmitted lights, both lights being equally modified, if at all, by the second window of plain glass, while for interior decoration the window of plain glass is not necessary. This combination of the window of plain glass with the one composed of colored glass and immediate empty spaces is illustrated in Fig. 2.

D represents the window of colored glass, fixed in the frame in which E (the window of plain glass) slides up and down, as desired. This window of plain glass may be placed on either side of the one of colored glass; but it is generally more convenient to have it on the inside.

It is my intention to apply my invention in all places and for all purposes in which a transmitted colored light, in combination with a direct light and air, may be useful or ornamental.

What I claim is—

1. A window or screen consisting of a frame-work containing colored panes, forming a pattern of colored glass, and intermediate empty spaces for the passage of direct light, substantially as shown and described.

2. The combination, in a window-frame, of a screen or window consisting of pieces or a pattern of colored glass and intermediate empty spaces in a frame-work, with a second window of plain glass, substantially as shown and described.

LOUIS C. TIFFANY.

Witnesses:
WM. S. SKINNER,
HENRY BEENY.

Corrections in Letters Patent No. 254,409.

It is hereby certified that in Letters Patent No. 254,409, granted February 28, 1882, to Louis C. Tiffany, Morristown, N. J., for an improvement in "Colored Glass Windows," the word "intermediate," in line 70 of the printed specification attached to and forming a part of said Letters Patent, was erroneously printed "immediate;" that the proper corrections have been made in the files and records of the Patent Office and are hereby made in said Letters Patent.

Signed, countersigned and sealed this 7th day of March, A. D. 1882.

[SEAL.]

A. BELL.
*Acting Secretary of the Interior.*

Countersigned:

E. M. MARBLE,
*Commissioner of Patents.*